United States Patent

Hayashi et al.

[11] Patent Number: 6,058,962
[45] Date of Patent: May 9, 2000

[54] FLOW RATE REGULATING VALVE OF HYDRAULIC PUMP

[75] Inventors: Masumi Hayashi; Tetsuji Hayashi; Ryoichi Nagasaka, all of Tokyo, Japan

[73] Assignee: Kayaba Kogyo Co., Ltd., Tokyo, Japan

[21] Appl. No.: 09/202,400

[22] PCT Filed: Jan. 17, 1997

[86] PCT No.: PCT/JP97/00083

§ 371 Date: Dec. 14, 1998

§ 102(e) Date: Dec. 14, 1998

[87] PCT Pub. No.: WO98/05545

PCT Pub. Date: Feb. 12, 1998

[30] Foreign Application Priority Data

Aug. 2, 1996 [JP] Japan ................................ 8-219114

[51] Int. Cl.[7] .................. B62D 5/07; F16K 3/26
[52] U.S. Cl. .................. 137/115.05; 137/115.07; 137/115.15; 137/115.19
[58] Field of Search .............. 137/115.05, 115.07, 137/115.09, 115.1, 115.15, 115.19

[56] References Cited

U.S. PATENT DOCUMENTS

| | | |
|---|---|---|
| 2,642,887 | 6/1953 | Renick ................. 137/115.19 |
| 2,696,828 | 12/1954 | Husing ................. 137/115.19 |
| 4,311,161 | 1/1982 | Narumi et al. ............ 137/115.05 |
| 5,513,672 | 5/1996 | Nguyen et al. ........... 137/115.09 |

FOREIGN PATENT DOCUMENTS

| | | |
|---|---|---|
| 524549 | 2/1993 | Japan . |
| 5246334 | 9/1993 | Japan . |
| 6321122 | 11/1994 | Japan . |
| 8282513 | 10/1996 | Japan . |
| 939811 | 10/1997 | Japan . |

*Primary Examiner*—Stephen M. Hepperle
*Attorney, Agent, or Firm*—Steinberg & Raskin, P.C.

[57] ABSTRACT

A flow control valve for a hydraulic pump is disclosed, which is so constructed that a first pilot chamber (101A) and a second pilot chamber (101B) are arranged in a manner to face a piston (102), resulting in the piston (102) varying initial load of a spring (9). Constrictions (106A) and (106B) are arranged in the middle of a communication passage through which the second pilot chamber (101B) is drained and in the middle of a communication passage which permits the second pilot chamber (101B) to communicate with the first pilot chamber (101A), respectively.

4 Claims, 7 Drawing Sheets

FLOW RATE REGULATING VALVE OF HYDRAULIC PUMP

TECHNICAL FIELD

This invention relates to a flow control valve for a hydraulic pump suitable for use as a hydraulic power source for a power steering device of a vehicle.

BACKGROUND ART

A power steering device equipped with a conventional flow control valve for a hydraulic pump is disclosed in Japanese Patent Application No. 115052/1995 filed by the assignee.

FIG. 7(A) shows a hydraulic pump in which a flow control valve FV disclosed in the Japanese application is integrally incorporated. A vane pump VP is used as the hydraulic pump.

The vane pump VP includes a housing H constructed of a pump body 10 and a cover 11. The housing H is formed with a shaft hole 12, in which a shaft 14 is rotatably supported through a bearing 13 arranged in the shaft hole 12. The shaft 14 functions as a drive shaft for a rotor 15 arranged in the pump body 10. The rotor 15 has a plurality of vanes 16 radially incorporated therein.

Also, the rotor 15 is mounted thereon with a cam ring 17 as shown in FIG. 7(B) which is viewed along line X—X of FIG. 7(A). The cam ring 17 has an inner surface formed into an elliptic shape. Driving of the shaft 14 permits rotation of the rotor 15, during which the vanes 16 are accessed to the inner surface of the cam ring 17. Thus, the vanes 16 are rotated while being intimately contacted with the cam ring 17 and permit chambers independent from each other to be defined therebetween.

When the chambers thus defined each are subject to a contraction stroke, hydraulic oil or fluid is discharged from a discharge port; whereas when each of the chambers is subject to an expansion stroke, hydraulic fluid is sucked thereinto.

The rotor 15 and cam ring 17 are commonly provided on a side surface thereof with a side plate 18. This results in a high-pressure chamber 19 being defined on a rear surface side of the side plate 18, so that a pump discharge pressure may be guided to the high-pressure chamber 19. A pressure of hydraulic fluid in the high-pressure chamber 19 forces the side plate 18 against the rotor 15 to keep loading balance.

The flow control valve VP, which will be described hereinafter, is arranged in a manner to be integral with the pump body 10 of the vane pump VP, so that a body of the flow control valve VP may also act as the body 10 of the vane pump VP.

The shaft 14 of the vane pump VP is connected to an engine (not shown), so that starting of the engine permits rotation of the rotor 15 connected to the shaft 14. Thus, an increase in rotational speed of the engine leads to an increase in fluid discharge rate at which hydraulic fluid is discharged from the vane pump VP.

The hydraulic fluid thus discharged from the vane pump VP, as shown in FIGS. 4 to 6, is guided through a pump port 4 to a pressure chamber 8a of the flow control valve PV and fed from an actuator port 20a to a power steering circuit PS through a feed passage.

At this time, such flowing of the hydraulic fluid discharged results in a pressure difference occurring between both sides of a variable constriction 3 arranged in the course or middle of the feed passage. A pressure on an upstream side acts on a left end surface of a spool 7 positioned on a side of the pressure chamber 8a and a pressure on a downstream side acts on a right end surface of the spool positioned on a side of a pilot chamber 8b through a pilot passage 29.

However, the spool 7 is not permitted to be moved in a right-hand direction unless thrust obtained by multiplying the pressure difference between both sides of the variable constriction 3 by a pressure receiving area of the spool 7 exceeds initial load of a spring 9 or unless a predetermined fluid discharge rate of the pump is obtained, resulting in a pump port 4 and a drain port 5 being kept isolated from each other. Therefore, all hydraulic fluid discharged from the pump is fed to the power steering circuit PS (an interval a of a characteristic line K shown in FIG. 4(B)).

When a rotational speed of the engine is increased to increase a fluid discharge rate, resulting in the pressure difference between both sides of the variable constriction 3 being increased to a predetermined level or above, the spool 7 is moved in a right-hand direction against the spring 9. Then, the spool 7 is stopped at a position at which the thrust described above and elastic force of the spring 9 are balanced with each other, to thereby permit the pump port 4 and drain port 5 to communicate with each other at a degree of opening corresponding to the position. This causes hydraulic fluid discharged from the pump to be returned thereto through the drain pump 5 depending on the degree of opening, so that the hydraulic fluid may be fed toward the power steering circuit PS at a maximum feed rate Q1 kept constant.

The maximum feed rate Q1 may be set on the basis of maximum power assisting force required.

A further increase in engine speed or rotational speed of the engine causes a decrease in fluid feed rate Q at which hydraulic fluid is fed to the power steering circuit PS for reasons described hereinafter. More particularly, an increase in fluid discharge rate of the pump causes a further increase in pressure difference between both sides of the variable constriction 3, leading to further movement of the spool 7 in the right-hand direction. Such movement of the spool 7 causes a diameter increased section 23a of a constriction member 23 to forcedly enter a constriction hole or orifice 22b, so that a degree of opening of the variable constriction 3 may be reduced. Also, the constriction member 23 is different in constriction effect thereof between when the diameter increased section 23a partially enter the orifice 22b and when the former entirely enters the latter. More specifically, an increase in degree at which the diameter increased section 23a enters the orifice 22b increases a pressure difference between both sides of the variable constriction 3, so that movement of the spool 7 may be increased to increase a degree of opening of the variable constriction 3 which affects a degree of communication between the pump port 4 and the drain port 5.

Thus, as indicated by the interval b of the characteristic line K in FIG. 4(B), hydraulic fluid is fed toward the power steering circuit PS at the maximum feed rate Q1 kept substantially constant until a rotational speed of the engine or an engine speed N reaches a predetermined level; whereas when the engine speed N exceeds the predetermined level, a flow rate at which fluid is fed to the power steering circuit PS is decreased, to thereby reduce the power steering force.

The engine speed N is substantially proportional to a velocity of the vehicle, to thereby permit application of the power assisting force corresponding to the velocity.

A maximum pressure applied to the power steering circuit PS is determined by a relief valve. More specifically, an increase in load pressure in the power steering circuit PS leads to an abnormal increase in pressure in the first pilot chamber 8b, which then acts on a ball poppet 33. When the pressure exceeds a relief set pressure determined by a spring 32, it forcibly opens the ball poppet 33 to permit the first pilot chamber 8b and drain port 5 to communicate with each other.

Such communication between the pilot chamber 8b and the drain port 5 causes fluid to flow through a pressure sensing hole 24, resulting in a pressure loss occurring through the hole 24. This leads to an abrupt reduction in pressure in the pilot chamber 8b, to thereby cause the spool 7 to be moved in a right-hand direction as shown in FIG. 5, resulting in a degree of opening of each of the pump port 4 and drain port 5 being increased to reduce a rate at which the pump feeds hydraulic fluid or a fluid feed rate of the pump.

Then, when a pressure in the power steering circuit PS is reduced to a level below the relief set pressure, the ball poppet 33 is set on a valve seat 34, so that a maximum pressure in the power steering circuit PS may be kept constant.

Also, the flow control valve FV, as shown in FIGS. 4 to 6, is so constructed that a piston 35 is arranged opposite to the spool 7 and has a change-over spool 36 incorporated therein.

Further, in the flow control valve FV, the spool 7 and piston 35 are arranged opposite to each other in the first pilot chamber 8b connected through the pilot passage 29 to a downstream side of the variable constriction 3 with the spring being interposedly arranged therebetween. This permits the piston 35 to be abutted against the spring 9 in the first pilot chamber 8b.

The piston 35 described above is formed on a central portion thereof with a flange 37, which functions to partition a cylinder hole 50 into a second pilot chamber 38 and a drain chamber 39. The drain chamber 39 is formed therein with a stepped portion 39a acting as a stopper, against which the flange 37 is abutted to prevent further movement of the piston 35.

The second pilot chamber 38 is arranged opposite to the first pilot chamber 8b with the piston 35 being interposed therebetween. Also, the drain chamber 39 is permitted to communicate with a tank passage (not shown) and kept from communicating with the first pilot chamber 8b. The piston 35 has one pressure receiving surface 35a arranged so as to face the first pilot chamber 8b and the other pressure surface 35b facing the second pilot chamber 38 and including a pressure receiving surface of the flange 37. The second pressure receiving surface 35b is formed so as to have a pressure receiving area larger than that of the first pressure receiving surface 35a.

The piston 35 is formed therein with a spool hole 40 in a manner to extend in an axial direction thereof. The spool hole 40 is so arranged that one end or a left end thereof is open to the first pilot chamber 8b and the other end or a right end thereof is closed. The spool thus formed has the change-over spool 36 slidably inserted thereinto, so that a pressure in the first pilot chamber 8b acts on a left end surface of the change-over spool 36.

Further, the spool hole 40 of the piston 35 is formed therein with an annular groove 41, which is arranged so as to communicate with the second pilot chamber 38 via a passage hole 42 of piston 35.

The change-over spool 36, as shown in FIG. 5(B), is formed thereon with two lands 43 and 44 in such a manner that an annular recess 45 is arranged therebetween. The right-hand land 44 of the change-over spool 36 has elastic force of a spring 46 applied thereto.

The annular recess 45 is arranged so as to constantly communicate with the drain chamber 39 through a passage 47 irrespective of a position of the piston 35 moved. Also, the change-over spool 36 is formed with a communication hole 48, to thereby permit a chamber in which a spring 49 is received to communicate with the drain chamber 39 through the annular recess 45. The change-over spool 36 constructed as described above is so operated that the land 43 interrupts communication between the first pilot chamber 8b and the annular groove 41 and permits the second pilot chamber 38 to communicate with the drain chamber 39 through the annular recess 45 and passage 47, when the change-over spool 36 is at a normal position shown in FIG. 5(A).

When the pump 1 is actuated, hydraulic fluid discharged from the pump 1, as described above, is guided through the pump port 4 to the pressure chamber 8a, as well as through the variable constriction 3 to the power steering circuit PS.

During non-steering, the power steering circuit PS is kept neutral, so that the hydraulic fluid is returned to the tank, resulting in a load pressure in the power steering circuit PS or a pressure on the downstream side of the variable constriction 3 being reduced. This keeps the pressure from exceeding a pressure set by the spring 46, so that the piston 35 is maintained at the normal position shown in FIG. 5(A). This results in initial load of the spring 9 in the first pilot chamber 8b being kept at a relatively reduced level.

Thus, the spool 7 is moved in the right-hand direction, until thrust obtained by multiplying a pressure difference between the pressure chamber 8a and the first pilot chamber 8b by a pressure receiving area of the spool 7 overcomes elastic force of the spring 9 in the first pilot chamber 8b, resulting in the spool 7 being balanced with load of the spring 9. Such movement of the spool 7 permits the pump port 4 to communicate with the drain port 5, so that the amount of fluid fed to the power steering circuit PS is reduced correspondingly.

When a maximum feed rate Q2 during the non-steering is set to be less than the above-described maximum feed rate Q1, energy loss during the non-steering requiring no assisting force may be significantly reduced.

During steering, when a pressure in the first pilot chamber 8b exceeds the set pressure determined by the spring 46, the change-over spool 36 is moved in the right-hand direction against elastic force of the spring 46, to thereby permit the first pilot chamber 8b and annular groove 41 to communicate with each other. The annular groove 41, as described above, is kept communicating with second pilot chamber 38 through the passage hole 42, resulting in communication between the first pilot chamber 8b and the second pilot chamber 38. This permits a pressure on the downstream side of the variable constriction 3 to be applied to each of the first pilot chamber 8b and second pilot chamber 38. Such application of the pressure on the downstream side of the variable constriction 3 to both pilot chambers 8b and 38 causes the piston 35 to be moved in the left-hand direction due to a difference in pressure receiving area between the pressure receiving surfaces 35a and 35b of the piston 35 as shown in FIG. 6(A). The maximum amount of movement of the piston 35 is regulated by abutment between the piston 35 and the stopper or stepped portion 39a.

Such movement of the piston 35 forcibly compresses the spring 9, resulting in load of the spring 9 being relatively increased. Such an increase in load of the spring 9 relatively reduces the amount of movement of the spool 7 which causes thrust based on a difference between a pressure in the pressure chamber 8a and that in the first pilot chamber 8b to be balanced with load of the spring 9, so that the amount of fluid fed from the pressure chamber 8a to the drain port 5 may be decreased. This results in a fluid feed rate at which fluid is fed to the power steering circuit PS being increased to the maximum feed rate Q1, so that flow characteristics indicated at the characteristic line K in FIG. 4(B) are obtained during the steering.

As will be noted from the above, the conventional flow control valve is so constructed that during the steering, the maximum feed rate Q1 is ensured to provide the power steering circuit PS with sufficient power and during the non-steering requiring no assisting force, the maximum feed rate Q2 of the pump 1 is reduced as compared with the maximum feed rate Q1 ensured in the steering, to thereby minimize energy loss.

In the prior art described above, when the operation is changed from the non-steering state to the steering state, a pressure in the first pilot chamber 8b is increased to cause the change-over spool 36 to be moved in the right-hand direction against the spring 46, resulting in the first pilot chamber 8b and second pilot chamber 38 communicating with each other.

However, at this time, the left end surface of the change-over spool 36 is caused to be open directly to the annular groove 41, so that the passage thereof is rapidly increased in area. This causes the change-over piston 35 to be rapidly moved in the left-hand direction, resulting in a feed pressure under which fluid is fed to the power steering circuit PS or power assisting force being abruptly varied, so that a driver of the vehicle has a feeling of disorder.

When the operation is changed from the steering state to the non-steering state, the passage between the second pilot chamber 38 and the first pilot chamber 8b is rapidly closed, followed by opening of the second pilot chamber 38 to the drain chamber 39, resulting in such problems as described above likewise occurring.

Also, in the prior art described above, the piston 35 is incorporated directly in a cylinder hole 50 formed in the body 10, followed by closing of the cylinder hole 50 with a plug 51. This requires incorporation of the piston 35 in the flow control valve during assembling thereof, resulting in the assembling being highly troublesome and costly. Further, for example, when it is desired to eliminate the piston 35 from the flow control valve after incorporation of the piston 35 into the flow control valve, it is required to remove the plug 51 and then eliminate the piston 35 therefrom. Thus, such elimination of the piston 35 is highly troublesome.

Moreover, in the prior art described above, the sleeve 49 pressedly fitted in the body 10 and the spool 7 guided into the body 10 are inserted into the body 10 from a side of the pressure chamber 8a. In order to ensure a space required for the insertion, it is required to arrange a constriction plate 22 formed with the constriction hole or orifice 22b separately from the constriction member 23. Thus, it is required to threadedly hold the constriction plate 22 indirectly in the body 10 by means of the plug 20 after incorporation of the sleeve 49 and spool 7 in the body 10.

Unfortunately, arrangement of the constriction plate 22 separately from the constriction member 23 causes misregistration between the constriction member 23 of the spool 7 and the orifice 22b, to thereby fail to provide the constriction member 23 and orifice with satisfactory coaxiality. This adversely affects a constriction effect or function of the variable constriction 3 constituted by a combination of the orifice 22b and constriction member 23.

The present invention has been made in view of the foregoing disadvantage of the prior art. It is an object of the present invention to provide a flow control valve for a hydraulic pump which is capable of keeping a driver from having a feeling of any disorder when it is used for a power steering apparatus, constructing a piston into a cartridge-type structure to facilitate incorporation thereof in the flow control valve, and permitting a variable constriction to exhibit a stable constriction function.

DISCLOSURE OF INVENTION

In accordance with one aspect of the present invention, a flow control valve for a hydraulic pump is provided. The flow control valve generally includes a variable constriction arranged in the middle of a hydraulic fluid feed passage for feeding hydraulic fluid discharged from a hydraulic pump, a body, a spool slidably incorporated in the body, a pressure chamber arranged so as to face one end of the spool, a drain port arranged so as to communicate with a tank, a first pilot chamber arranged so as to face the other end of the spool, a spring arranged so as to act initial load on the end of the spool facing the first pilot chamber. The pressure chamber has a pressure on an upstream side of the variable constriction guided thereto. The first pilot chamber has a pressure on a downstream side of the variable constriction guided thereto. The pressure chamber has a pressure therein which overcomes elastic force of the spring and an action of a pressure in the first pilot chamber to move the spool when a pressure difference between both sides of the variable constriction reaches a predetermined level or more. Also, the pressure chamber is rendered open to the drain port at a degree of opening corresponding to a position of the spool. The flow control valve also includes a piston arranged so as to face the first pilot chamber while being opposite to the other end of the spool and abutted against the spring, a second pilot chamber arranged opposite to the first pilot chamber with the piston being interposed therebetween, and a change-over spool slidably incorporated in the piston to permit a pressure in the first pilot chamber to act thereon. The change-over spool acts to drain the second pilot chamber at a normal position thereof and moving to permit the second pilot chamber to communicate with the first pilot chamber when a pressure in the first pilot chamber reaches a predetermined level or more. The piston is so formed that a first pressure receiving surface thereof facing the first pilot chamber has an area smaller than that of a second pressure receiving surface thereof facing the second pilot chamber.

The flow control valve according to the first aspect of the present invention thus generally constructed is characterized in that constrictions are arranged in the middle of a communication passage through which the second pilot chamber is drained and in the middle of a communication passage which permits the second pilot chamber to communicate with the first pilot chamber, respectively.

In accordance with a second aspect of the present invention, a flow control valve for a hydraulic pump is provided. The flow control valve likewise includes a variable constriction arranged in the middle of a hydraulic fluid feed passage for feeding hydraulic fluid discharged from a hydraulic pump, a body, a spool slidably incorporated in the body, a pressure chamber arranged so as to face one end of the spool, a drain port arranged so as to communicate with a tank, a first pilot chamber arranged so as to face the other end of the spool, a spring arranged so as to act initial load on the end of the spool facing the first pilot chamber. The pressure chamber has a pressure on an upstream side of the variable constriction guided thereto. The first pilot chamber has a pressure on a downstream side of the variable constriction guided thereto. The pressure chamber has a pressure therein which overcomes elastic force of the spring and an action of a pressure in the first pilot chamber to move the spool when a pressure difference between both sides of the variable constriction reaches a predetermined level or more. Also, the pressure chamber is rendered open to the drain port at a degree of opening corresponding to a position of the spool. The flow control valve also includes a piston arranged so as to face the first pilot chamber while being opposite to the other end of the spool and abutted against the spring, a second pilot chamber arranged opposite to the first pilot chamber with the piston being interposed therebetween, and a change-over spool slidably incorporated in the piston to permit a pressure in the first pilot chamber to act thereon. The change-over spool acts to drain the second pilot chamber at a normal position thereof and moving to permit the second pilot chamber to communicate with the first pilot chamber when a pressure in the first pilot chamber reaches a predetermined level or more. The piston is so formed that a first pressure receiving surface thereof facing the first pilot chamber has an area smaller than that of a second pressure receiving surface thereof facing the second pilot chamber.

The flow control valve according to the second aspect of the present invention thus generally constructed is characterized in that the body is formed on an end thereof positioned on a side thereof opposite to the pressure chamber with a mounting port in a manner to face the other end of the spool, the change-over spool is incorporated in a piston and the second pilot chamber is previously formed in a piston casing, the piston casing is mounted in the mounting port together with the spring, so that the first pilot chamber is formed in a manner to face the spool and piston, the spring is interposedly arranged between the spool and the piston, and the piston casing is arranged so as to be detachable with respect to the mounting port.

In a preferred embodiment of the present invention, the variable constriction is constituted by a rod-like constriction member provided on the end of the spool facing the pressure chamber and a constriction hole in which the constriction member is inserted. Also, the variable constriction is so constructed that a degree of opening thereof is varied depending on a relative position between the constriction member and the constriction hole. The constriction hole is formed in a constriction plate, which is integrally formed in the body.

BEST MODES FOR CARRYING OUT INVENTION

Figure 1:
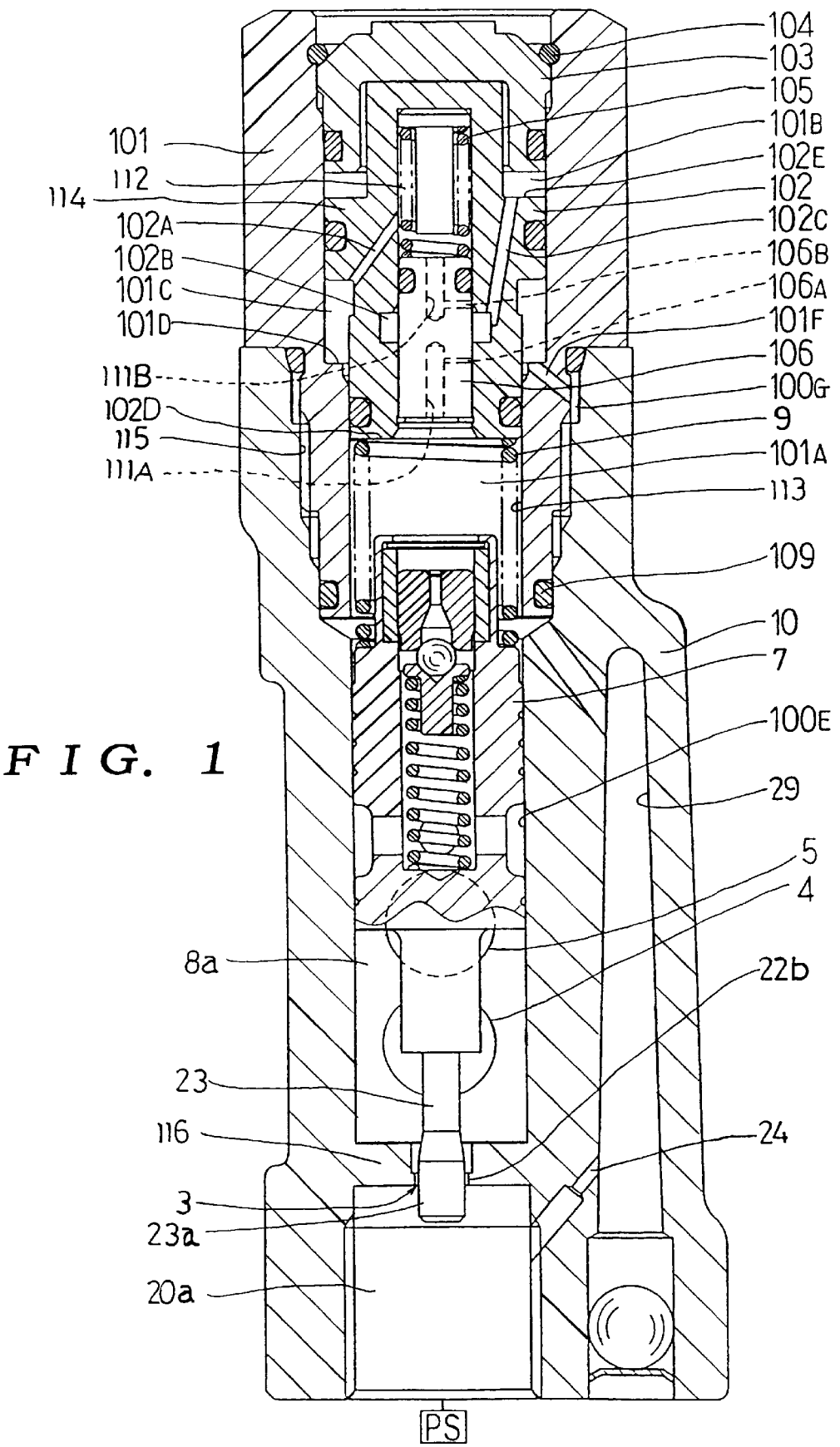
FIG. 1 is a sectional view showing an embodiment of a flow control valve for a hydraulic pump according to the present invention which is during non-steering.
Figure 2:
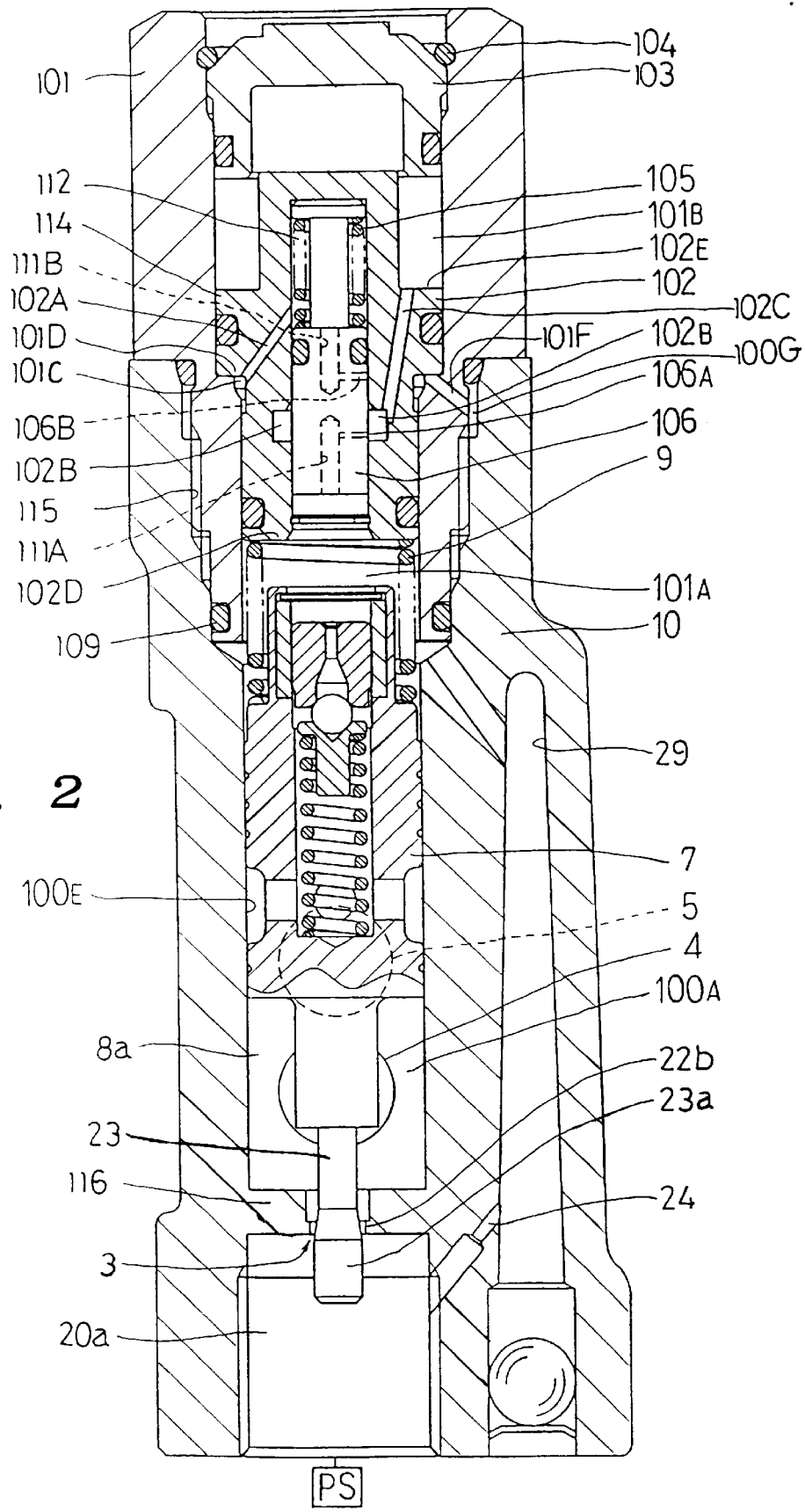
FIG. 2 a sectional view of the flow control valve shown in FIG. 1 which is during steering.
Figure 3:
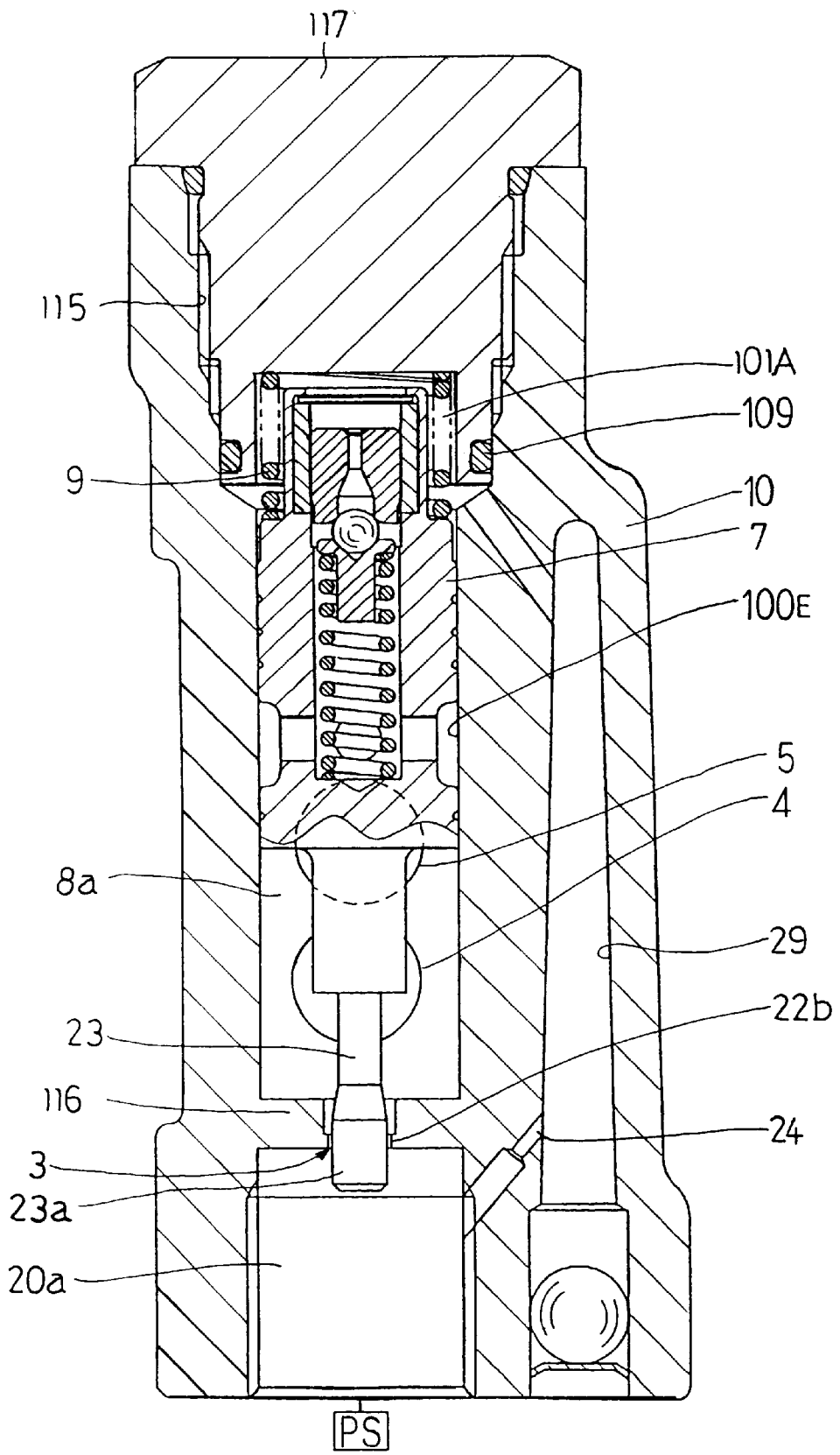
FIG. 3 is a sectional view of the flow control valve shown in FIGS. 1 and 2 wherein a plug is substituted for a piston casing.
Figure 4A:
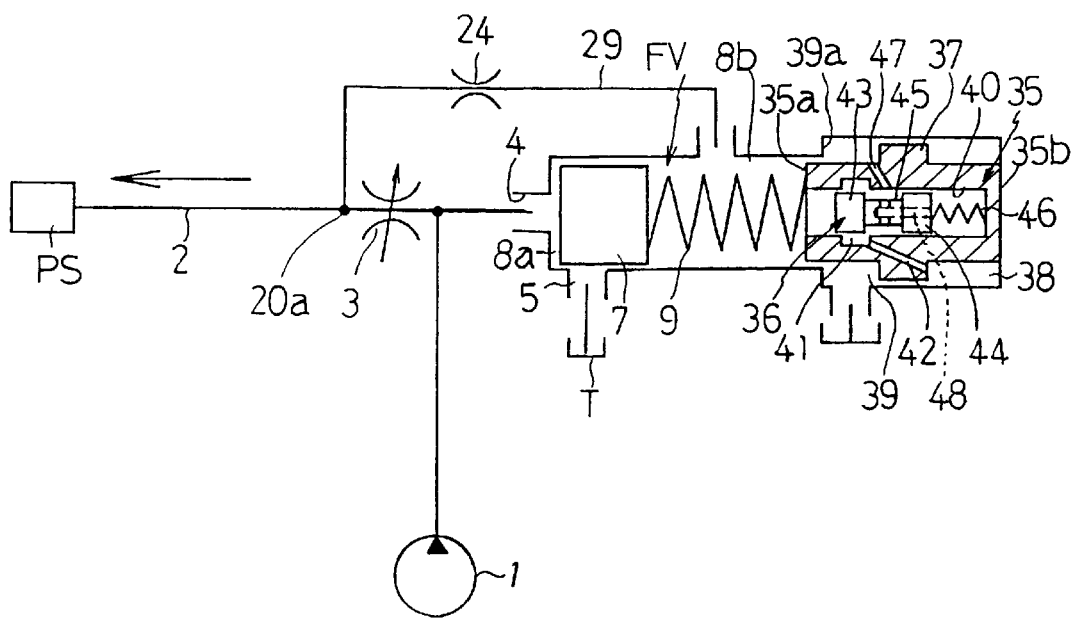
FIG. 4(A) is a circuit diagram showing a conventional power steering device.
Figure 4B:
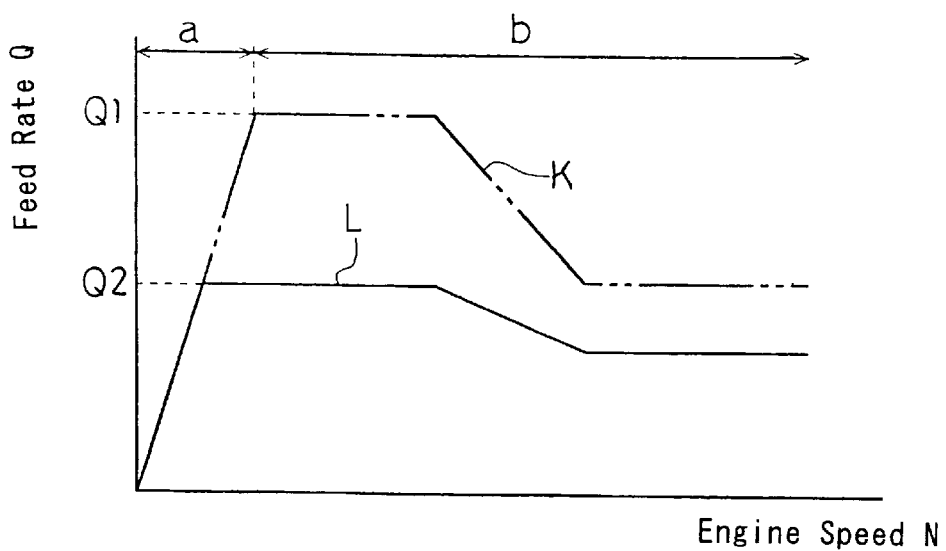
FIG. 4(B) is a graphical representation showing feed rate characteristics of the power steering device shown in FIG. 4(A)
Figure 5A:
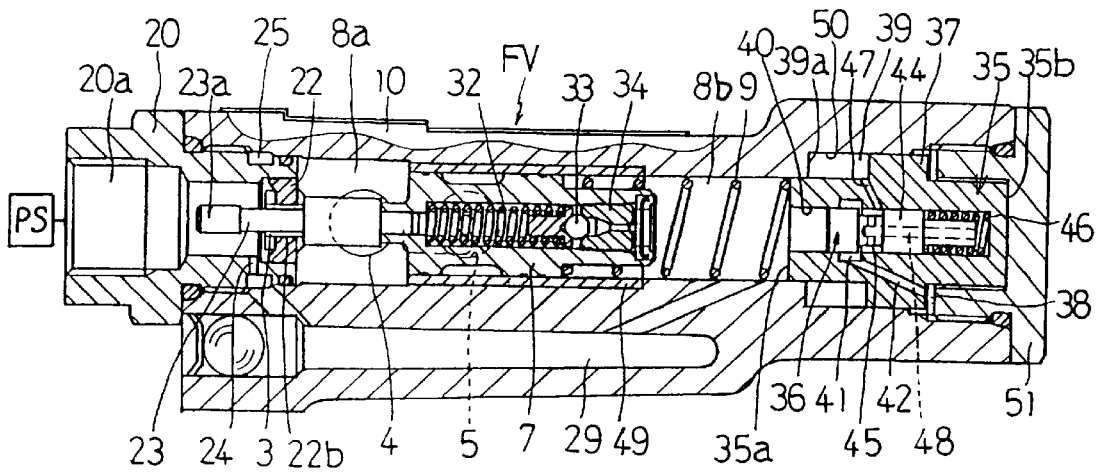
FIG. 5(A) is a sectional view showing a conventional flow control valve which is during interruption of a pump.
Figure 5B:
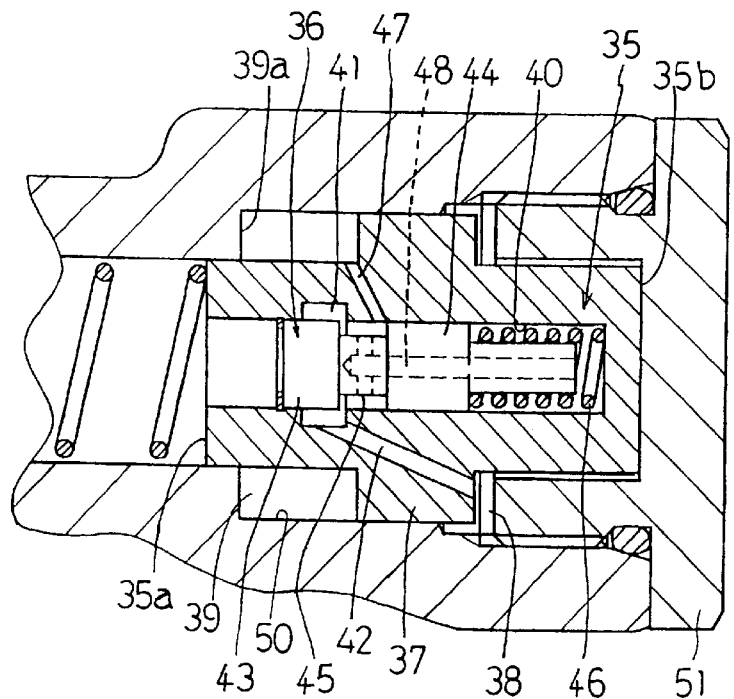
FIG. 5(B) is a fragmentary enlarged sectional view showing a piston incorporated in the flow control valve of FIG. 5(A)
Figure 6A:
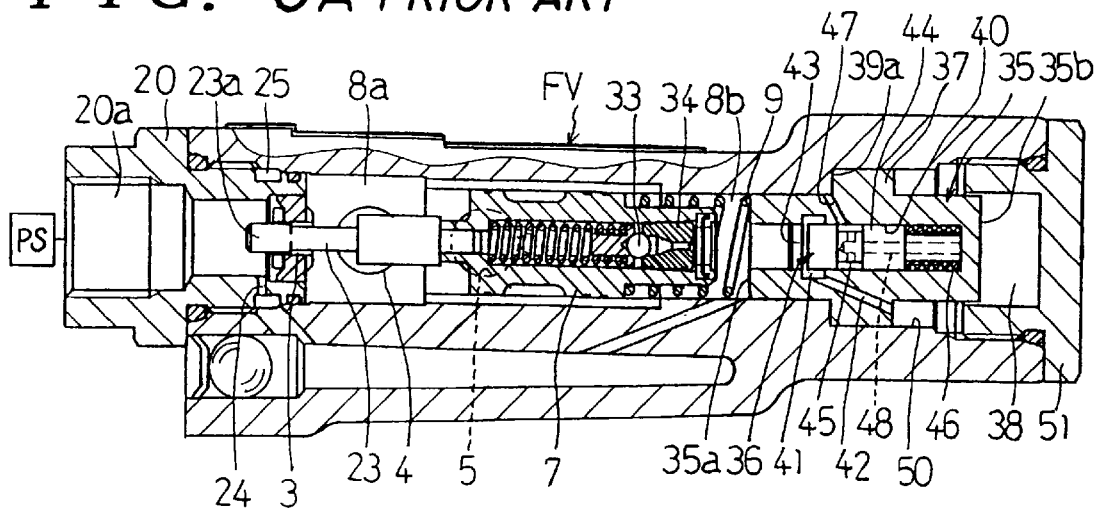
FIG. 6(A) is a sectional view showing a conventional flow control valve which is during steering.
Figure 6B:
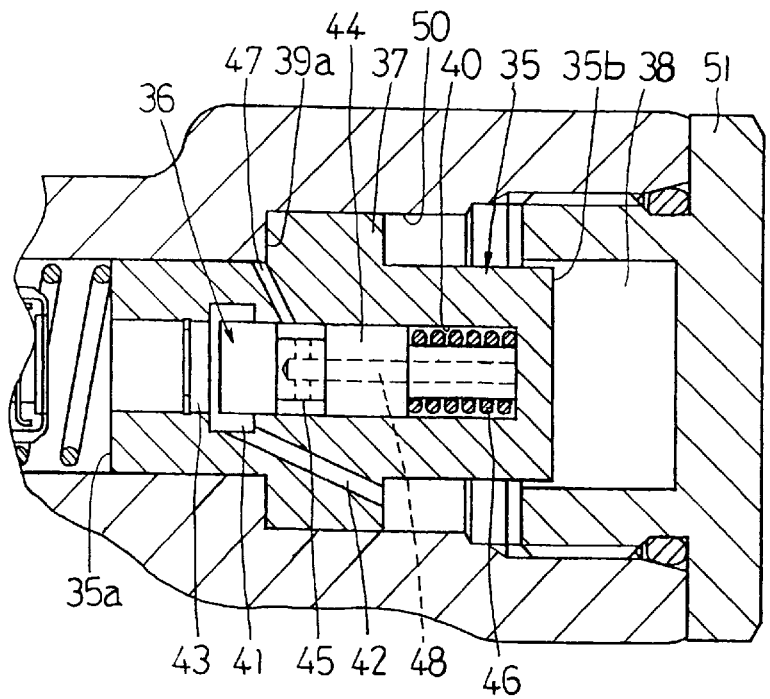
FIG. 6(B) is a fragmentary enlarged sectional view showing a piston incorporated in the flow control valve of FIG. 6(A)
Figure 7A:
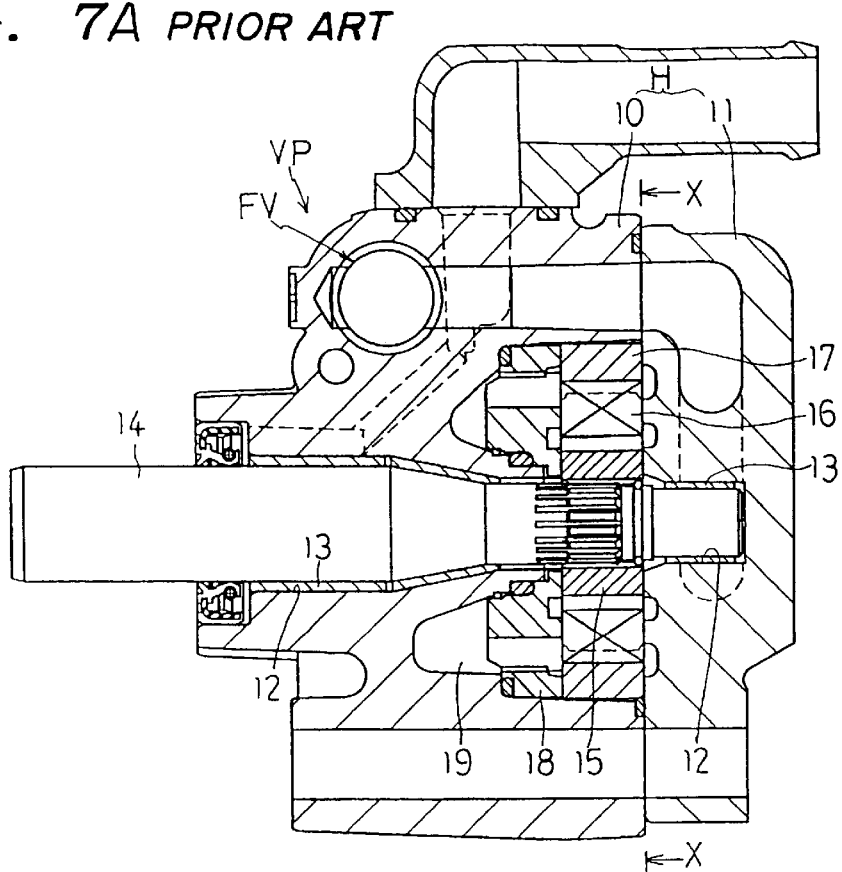
FIG. 7(A) is a sectional view showing a vane pump.
Figure 7B:
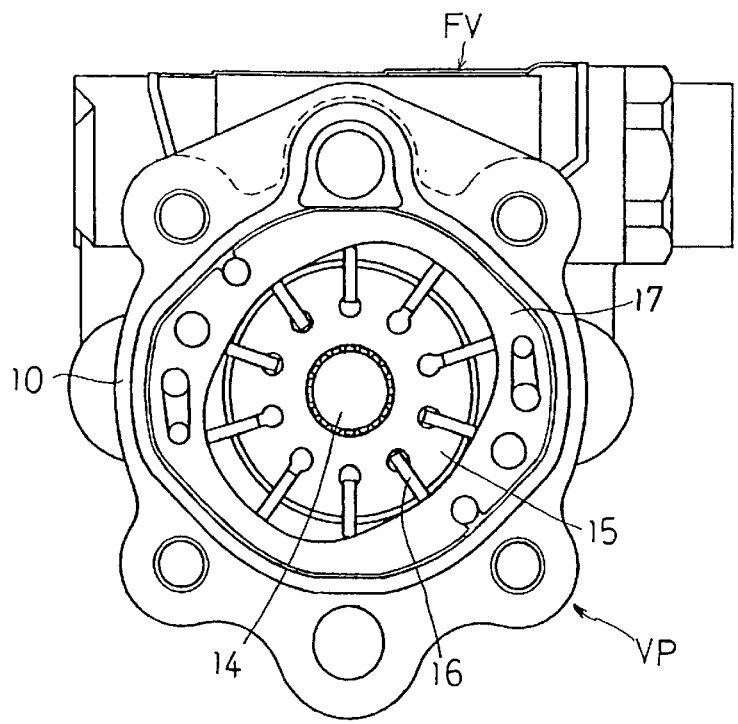
FIG. 7(B) is an end view viewed along line X—X of FIG. 7(A).

Referring first to FIGS. 1 to 3, an embodiment of a flow control valve for a hydraulic pump according to the present invention is illustrated. A flow control valve of the illustrated embodiment is basically constructed in substantially the same manner as the prior art described above; therefore, the following description will be made mainly in connection with a structure of the illustrated embodiment different from the prior art. Also, detailed description of like components will be eliminated in principle.

The flow control valve of the illustrated embodiment is featured in that a change-over spool 106 is provided with constrictions 106A and 106B.

The illustrated embodiment is so constructed that during non-steering, a load pressure in a power steering circuit PS or a pressure on a downstream side of a variable constriction 3 is kept from exceeding a set pressure determined by a spring 105 as in the prior art described above. Thus, the piston 102 is kept at a normal position shown in FIG. 1, at which a second pilot chamber 101B is permitted to communicate with a drain chamber 101C through a communication hole 102C, an annular groove 102B, a passage hole 111B, a spring chamber 112 and a passage 102A which are formed at the change-over spool 106. The constriction 106B is arranged in the course or middle of such a communication passage. In the illustrated embodiment, the constriction 106B is formed by means of a drill or the like so as to extend in a direction perpendicular to an axial direction of the change-over spool 106.

Thus, when the piston 102 is at the normal position, a spring 9 has initial load kept at a relatively reduced level; so that a maximum feed rate Q2 may be reduced as compared with a maximum feed rate Q1 to minimize energy loss during non-steering requiring no assisting force as in the prior art described above.

Then, when the operation is changed over from the non-steering state to a steering state, a pressure in a first pilot chamber 101A is increased with an increase in load pressure in the power steering circuit PS, to thereby permit the change-over spool 106 to be moved against the spring 105 as in the prior art described above. This, as shown in FIG. 2, permits the second pilot chamber 101B to communicate with the first pilot chamber 110a through the communication hole 101C, the annular groove 102B and a passage hole 11A, so that the piston 102 may be moved in a direction of contracting the spring 9 due to a difference in pressure receiving area between pressure receiving surfaces 102D and 102E thereof. The constriction 106A is arranged in the middle of such a communication passage. In the illustrated embodiment, the constriction 106A is formed by means of a drill or the like so as to extend in a direction perpendicular to an axial direction of the change-over spool 106.

Such movement of the piston in the direction in which the spring 9 is contracted permits initial load of the spring 9 to be relatively increased, to thereby ensure the maximum feed rate Q1 required for providing assisting force, resulting in preventing a shortage or deficiency of power.

In the operation described above, the constriction 106A restricts an area of the passage through which the first pilot chamber 101A and second pilot chamber 101B communicate with each other when the operation is changed over from the non-steering state to the steering state. This permits the piston 102 to be slowly moved during changing-over from the non-steering state to the steering state, to thereby prevent a sudden variation in feed pressure under which fluid is fed to the power steering circuit PS or power assisting force, resulting in a driver from having a feeling of any disorder.

Also, even when any pulsation occurs in the pressure in the first pilot chamber 101A, the constriction 106A absorbs or buffers such pulsation, to thereby keep it from being transmitted directly to the second pilot chamber 101B. This prevents any vibration of the piston 102 due to such pulsation.

Arrangement of the constrictions 106A and 106B in the change-over spool 106 in a manner to extend perpendicularly to the axis of the spool 106 facilitates formation of the constrictions 106A and 106B, to thereby reduce a cost for the spool while ensuring the above-described advantage.

Further, in the illustrated embodiment, the piston 102 is incorporated in a piston casing 101 rather than a body 10.

More specifically, the piston casing 101 is formed with a through-hole 113 extending in an axial direction thereof, in which the piston 102 is slidably incorporated. The piston 102 is formed thereon with a flange 114, which partitions the through-hole 113 into the second pilot chamber 101B and drain chamber 101C described above. The drain chamber 101C is formed therein with a stepped portion 101D acting as a stopper, so that the piston 102 is kept from being further moved due to abutment thereof against the stepped portion or stopper 101D.

The through-hole 113 has a stopper 103 fitted in one end or a distal end thereof, which is securely held therein by means of a C-shaped pin 104. This permits the second pilot chamber 101B to be defined between the stopper 103 and the flange 114.

The drain chamber 101C is isolated from the first pilot chamber 101A by means of a seal 109. The drain chamber 101C is open through a communication passage 101F to an outer peripheral surface of the piston casing 101.

The piston casing 101 thus formed is threadedly fitted in a mounting port 115 formed at one end of the body 10. At this time, the communication passage 101F communicating with the drain chamber 101C is permitted to communicate with a tank passage (not shown) through a chamber 100G defined by cooperation of the body 10 and piston casing 101 with each other. Also, the piston casing 101 is formed in the other end or a distal end thereof with the first pilot chamber 101A which constitutes a part of the through-hole 113 and has the spring 9 arranged therein and in which a spool 7 is partially placed.

The above-described construction of the illustrated embodiment wherein the piston 102 is previously incorporated in the piston casing 101 to provide a cartridge structure facilitates incorporation of the piston 102 in the flow control valve and reduces a manufacturing cost of the valve.

Also, when a plug 117 adapted to be threadedly fitted in the mounting port 115 is provided separately from the piston casing 101 as shown in FIG. 3, any one of the piston casing 101 and plug 117 may be selectively incorporated therein as desired. This permits a user to select either the flow control valve including the piston 102 or that free from the piston 102 as desired.

In addition, the illustrated embodiment is so constructed that a constriction hole or orifice 22b which constitutes a part of the variable constriction 3 is formed in a constriction plate 116 integrally provided in the body 10 rather than in any constriction plate provided separately from the body 10.

More particularly, the body 10 is provided therein with the mounting port 115, which is formed into a diameter larger than that of the spool 7, so that the spool 7 may be inserted through the mounting port 115 into the body 10. This eliminates a necessity of providing any space required for insertion of the spool 7 on a side of the pressure chamber 8a, therefore, it is not required to provide the constriction plate 116 separately from the body 10.

Further, a spool hole 100E for slidably guiding the spool 7 therein and the constriction hole 22b are directly formed in the body 10, so that coaxial formation thereof may be facilitated by means of a single chuck, to thereby provide both holes 100E and 22b with increased coaxiality. This permits coaxiality between a constriction member 23 provided in the spool 23 and the constriction hole 22b formed in the constriction plate 116 to be necessarily increased, so that the variable constriction 3 provided by a combination of both may exhibit a stable constriction function.

The illustrated embodiment is free from any sleeve for slidably guiding the spool 7. Alternatively, such a sleeve may be inserted into the body 10. In this instance, the sleeve may be inserted thereinto from a side of the mounting port 115.

INDUSTRIAL APPLICABILITY

The first aspect of the present invention permits initial load of the spring to be varied by the piston. Such construction of the present invention, when the flow control valve of the present invention is used for, for example, a power steering device, effectively prevents deficiency of power on a side of the power steering circuit during the steering and reduces the maximum feed rate of the pump to minimize energy loss during the non-steering.

In particular, arrangement of the constriction in the flow control valve of the present invention permits slow movement of the piston at the time when the first pilot chamber and second pilot chamber communicate with each other and at the time when the communication therebetween is interrupted. Thus, application of the flow control valve to the power steering device prevents a sudden variation in fluid feed pressure to the power steering circuit or power assisting force, to thereby keep a driver from having a feeling of any disorder.

Also, the flow control valve of the present invention, even when a pressure in the first pilot chamber pulsates when the second pilot chamber is kept communicating with the first pilot chamber, permits the constriction to buffer such pulsation of the pressure, to thereby prevent transmission of the pulsation directly to the second pilot chamber. This prevents vibration of the piston due to the pulsation.

The second aspect of the present invention permits the piston to be constructed into a cartridge structure by previously incorporating the piston in the piston casing, to thereby facilitate incorporation of the piston in the body, resulting in reducing a manufacturing cost of the flow control valve.

When the plug adapted to be detachably mounted in the mounting port is prepared separately from the piston casing, it is possible to select the piston casing or plug, to thereby provide either a piston-incorporated flow control valve or a piston-free flow control valve as desired.

Further, in accordance with the present invention, the constriction formed with the constriction hole may be integrally provided in the body, so that the constriction hole may be formed coaxially with the spool hole. This permits coaxiality between the constriction hole and the constriction hole of the spool guided in the spool hole to be necessarily increased, so that the variable constriction constructed of a combination of both may exhibit stable constriction function.

We claim:

1. A flow control valve for a hydraulic pump, comprising:
   a variable constriction (3) arranged in the middle of a hydraulic fluid feed passage for feeding hydraulic fluid discharged from a hydraulic pump (VP);
   a body (10);
   a spool (7) slidably incorporated in the body (10);
   a pressure chamber (8a) arranged so as to face one end of the spool (7);
   a drain port (5) arranged so as to communicate with a tank;
   a first pilot chamber (101A) arranged so as to face the other end of the spool (7);
   a spring (9) arranged so as to act initial load on the end of the spool (7) facing the first pilot chamber (101A);
   the pressure chamber (8a) having a pressure on an upstream side of said variable constriction (3) guided thereto;
   the first pilot chamber (101A) having a pressure on a downstream side of said variable constriction (3) guided thereto;
   the pressure chamber (8a) having a pressure therein which overcomes elastic force of the spring (9) and an action of a pressure in the first pilot chamber to move the spool (7) when a pressure difference between both sides of the variable constriction (3) reaches a predetermined level or more;
   the pressure chamber (8a) being rendered open to the drain port (5) at a degree of opening corresponding to a position of the spool (7);
   a piston (102) arranged so as to face the first pilot chamber (101A) while being opposite to the other end of the spool (7) and abutted against said spring (9);
   a second pilot chamber (101B) arranged opposite to the first pilot chamber (101A) with the piston (102) being interposed therebetween; and
   a change-over spool (106) slidably incorporated in the piston (102) to permit a pressure in the first pilot chamber (101A) to act thereon;
   the change-over spool (106) draining the second pilot chamber (101B) at a normal position thereof and moving to permit the second pilot chamber (101B) to communicate with the first pilot chamber (101A) when a pressure in the first pilot chamber (101A) reaches a predetermined level or more;
   the piston (102) being so formed that a first pressure receiving surface thereof facing the first pilot chamber (101A) has an area smaller than that of a second pressure receiving surface thereof facing the second pilot chamber (101B),
   characterized in that:
   constrictions (106A) and (106B) are arranged in the middle of a communication passage through which the second pilot chamber (101B) is drained and in the middle of a communication passage which permits said second pilot chamber (101B) to communicate with the first pilot chamber (101A), respectively.

2. A flow control valve for a hydraulic pump, comprising:
   a variable constriction (3) arranged in the middle of a hydraulic fluid feed passage for feeding hydraulic fluid discharged from a hydraulic pump (VP);
   a body (10);
   a spool (7) slidably incorporated in the body (10);
   a pressure chamber (8a) arranged so as to face one end of the spool (7);
   a drain port (5) arranged so as to communicate with a tank;
   a first pilot chamber (101A) arranged so as to face the other end of the spool (7);
   a spring (9) arranged so as to act initial load on the end of the spool (7) facing the first pilot chamber (101A);
   the pressure chamber (8a) having a pressure on an upstream side of said variable constriction (3) guided thereto;
   the first pilot chamber (101A) having a pressure on a downstream side of said variable constriction (3) guided thereto;
   the pressure chamber (8a) having a pressure therein which overcomes elastic force of the spring (9) and an action of a pressure in the first pilot chamber to move the spool (7) when a pressure difference between both sides of the variable constriction (3) reaches a predetermined level or more;
   the pressure chamber (8a) being rendered open to the drain port (5) at a degree of opening corresponding to a position of the spool (7);
   a piston (102) arranged so as to face the first pilot chamber (101A) while being opposite to the other end of the spool (7) and abutted against said spring (9);
   a second pilot chamber (101B) arranged opposite to the first pilot chamber (101A) with the piston (102) being interposed therebetween; and
   a change-over spool (106) slidably incorporated in the piston (102) to permit a pressure in the first pilot chamber (101A) to act thereon;
   the change-over spool (106) draining the second pilot chamber (101B) at a normal position thereof and moving to permit the second pilot chamber (101B) to communicate with the first pilot chamber (101A) when a pressure in the first pilot chamber (101A) reaches a predetermined level or more;
   the piston (102) being so formed that a first pressure receiving surface thereof facing the first pilot chamber (101A) has an area smaller than that of a second pressure receiving surface thereof facing the second pilot chamber (101B),
   characterized in that:
   the body (10) is formed on an end thereof positioned on a side thereof opposite to the pressure chamber (8a) with a mounting port (115) in a manner to face the other end of the spool (7);
   the change-over spool (106) is incorporated in a piston (102) and the second pilot chamber (101B) is previously formed in a piston casing (101);

the piston casing (101) is mounted in said mounting port (115) together with the spring (9), so that the first pilot chamber (101A) is formed in a manner to face the spool (7) and piston (102);

the spring (9) is interposedly arranged between the spool (7) and the piston (102); and the piston casing (101) is arranged so as to be detachable with respect to the mounting port (115).

3. A flow control valve for a hydraulic pump as defined in claim 1, characterized in that the variable constriction (3) is constituted by a rod-like constriction member (23) provided on the end of the spool (7) facing the pressure chamber (8a) and a constriction hole (22b) in which the constriction member (23) is inserted;

said variable constriction (3) is so constructed that a degree of opening thereof is varied depending on a relative position between the constriction member (23) and the constriction hole (22b); and said constriction hole (22b) is formed in a constriction plate (116), which is integrally formed in the body (10).

4. A flow control valve for a hydraulic pump as defined in claim 2, characterized in that the variable constriction (3) is constituted by a rod-like constriction member (23) provided on the end of the spool (7) facing the pressure chamber (8a) and a constriction hole (22b) in which the constriction member (23) is inserted;

said variable constriction (3) is so constructed that a degree of opening thereof is varied depending on a relative position between the constriction member (23) and the constriction hole (22b); and said constriction hole (22b) is formed in a constriction plate (116), which is integrally formed in the body (10).

* * * * *